UNITED STATES PATENT OFFICE.

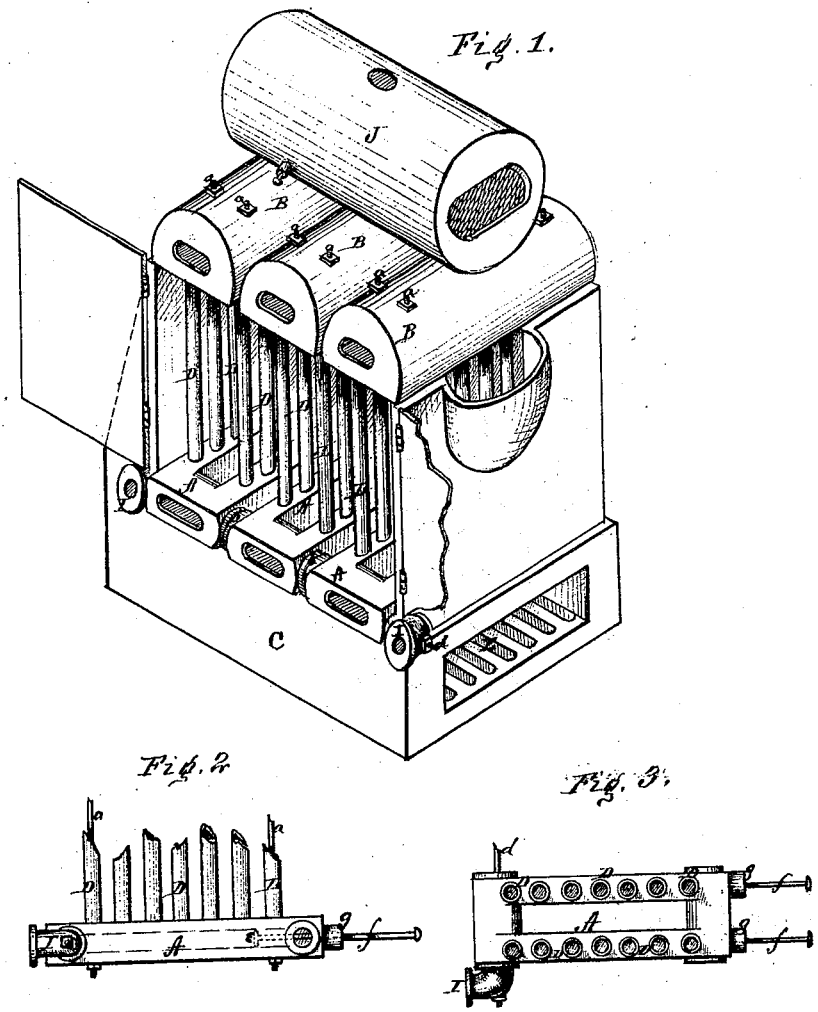

WALTER G. SAVAGE, OF KNOXVILLE, IOWA.

Letters Patent No. 109,765, dated November 29, 1870.

IMPROVEMENT IN STEAM-GENERATORS.

The Schedule referred to in these Letters Patent and making part of the same.

*To all whom it may concern:*

Be it known that I, WALTER G. SAVAGE, of Knoxville, in the county of Marion and in the State of Iowa, have invented certain new and useful Improvements in Steam-Boilers; and do hereby declare that the following is a full, clear, and exact description thereof, reference being had to the accompanying drawing and to the letters of reference marked thereon making a part of this specification.

The nature of my invention consists in the construction and arrangement of a steam-boiler, as will be hereinafter more fully set forth.

In order to enable others skilled in the art to which my invention appertains to make and use the same, I will now proceed to describe its construction and operation, referring to the annexed drawing, in which—

Figure 1 is a perspective view of my boiler made in sections, as will be presently described;

Figure 2 is a side view of the lower portion of one of the sections; and

Figure 3 is a plan view of the same.

A represents a vessel, of any desired dimensions and proportions, of cast-iron, with two separate water-tubes running from end to end, with cross-tubes at the ends, making a perfect water connection around the internal diameter of the vessel.

B represents another vessel, of any desired dimensions and proportions, of cast-iron, with only one water-tube, embracing its whole internal diameter from end to end, sufficient to embrace both the diameters of the tubes of the vessel A and the fire-space between them.

The vessel A is placed on a foundation, C, within which is the fire-box E, and vertical tubes D D, of any desired length and of any desired number, connect the two water-tubes of said vessel with the vessel B above, making a perfect circulation of water from the bottom vessel A to the upper vessel B, and forming one section of my boiler.

The two vessels A and B are forced and held firmly together, on the ends of the tubes D D, by bolts *a a*, through each end tube from top to bottom through both vessels, making steam-tight joints between tubes and vessels without packing.

The entire boiler is made by connecting as many of these cross-sections A B D as it takes to make the power desired.

These cross-sections are connected by having, at one end of each lower vessel A, a hub, *b*, turned to make a perfect fit into a turned recess of the next vessel, and so on continuously making a steam-tight joint drawn together by a bolt, *d*, passing through all the vessels, said bolt also connecting an elbow, I, at the outer end of both the first and last section, to receive and blow out the water.

Through one end of each water-tube in the lower vessel A enters a rod, *f*, surrounded at the end of the tube by a stuffing-box, *g*, and provided at its inner end with a scraper, *e*, for cleaning out the sediment.

It will be seen that in a boiler thus constructed the water occupies the tubes instead of the fire, thus separating the water into small bodies, receiving the quickest possible steam-generating heat from the least amount of fire, and the fire is preserved as much as possible in one intense body surrounding the water-tubes, with little to separate and destroy its intensity.

As the tubes can be placed as close as fire can be made to draw well, I can get the greatest possible amount of effective fire-surface to operate on the greatest possible amount of steam-generating surface that can be obtained in any form.

The locomotive or tubular boiler can get its fire-surface, but the moment the fire starts from the fire-box into the flue it begins to lose its intensity and is soon blown out, the draught carrying away the various gases that should be burned.

These gases are burned by my arrangement.

My boiler is also perfectly safe from explosion from the fact that all the tubes of water that are exposed to weakness from the fire are so small that their bursting could not make an explosion, and the dome J on top of the upper vessels B B, with said upper vessels, is not exposed to the fire.

The water is run into the boiler to the water-gauge in the dome.

The sediment scrapers *e e* are worked, at the pleasure of the engineer, to keep the lower vessels A A clean.

These sediment-scrapers are very important, as they allow me to use these small water lines at the bottom of my boiler, that gives me the spaces to have the fire rise alike in all parts of the boiler, while I get a large number of tubes in a very small space, all effective steam-generating surface.

Also, the elongated head or vessel B, while it forms a head for the tubes D D, becomes a cylinder itself for water, superseding the round head in that it can readily be cleaned out.

One cross-section forms a boiler complete in itself, and as many sections as may be desired can be connected together, forming any-sized boiler required.

The sections can easily be taken down and to pieces in a few minutes, if desired, to clean, or for any other purpose.

They are perfectly portable, and can be handled in sections or in parts, as desired.

I am aware that a boiler in which the products of combustion circulate around water-tubes is not new; hence I do not broadly claim such to be my invention.

What I claim is—

One or more primary boilers, A, constructed as described, and connected to one or more secondary boilers, B, by a series of water-tubes, D D, the latter being surmounted by a dome, J, the primary boilers and pipes being incased, and all arranged and used as and for the purposes set forth.

In testimony that I claim the foregoing, I have hereunto set my hand this 29th day of March, 1870.

WALTER G. SAVAGE.

Witnesses:
C. J. H. BROBST,
GEO. KINCK.